Dec. 16, 1969    H. M. BURNS, JR    3,484,167
FORMATION FLIGHT CONTROL SYSTEM
Filed July 11, 1967    6 Sheets-Sheet 2

PULSE REPETITION FREQUENCY

ANGULAR DISPLACEMENT OF FAN BEAM

PULSE REPETITION FREQUENCY

ANGULAR DISPLACEMENT OF FAN BEAM

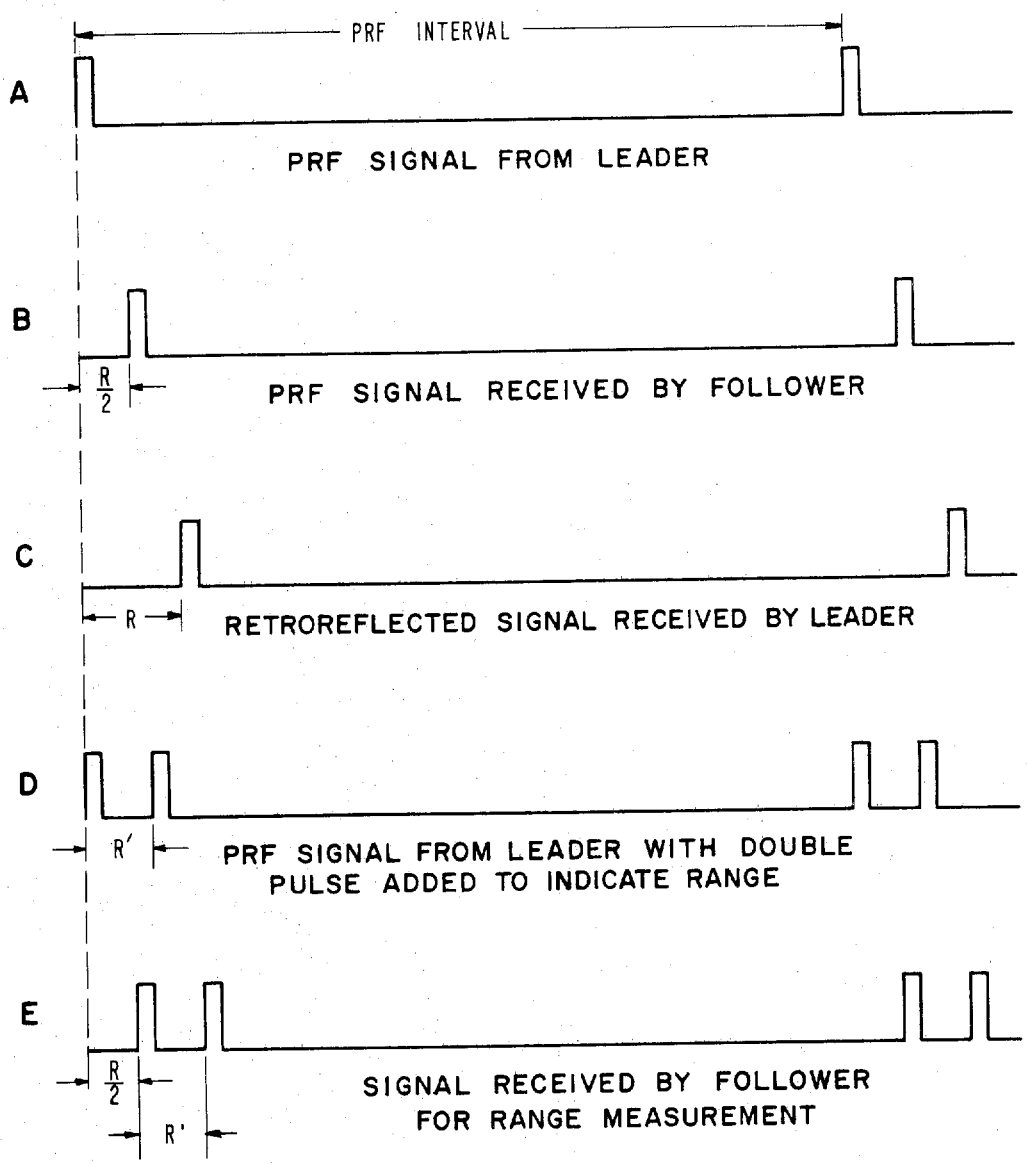

LEADER AIRCRAFT EQUIPMENT

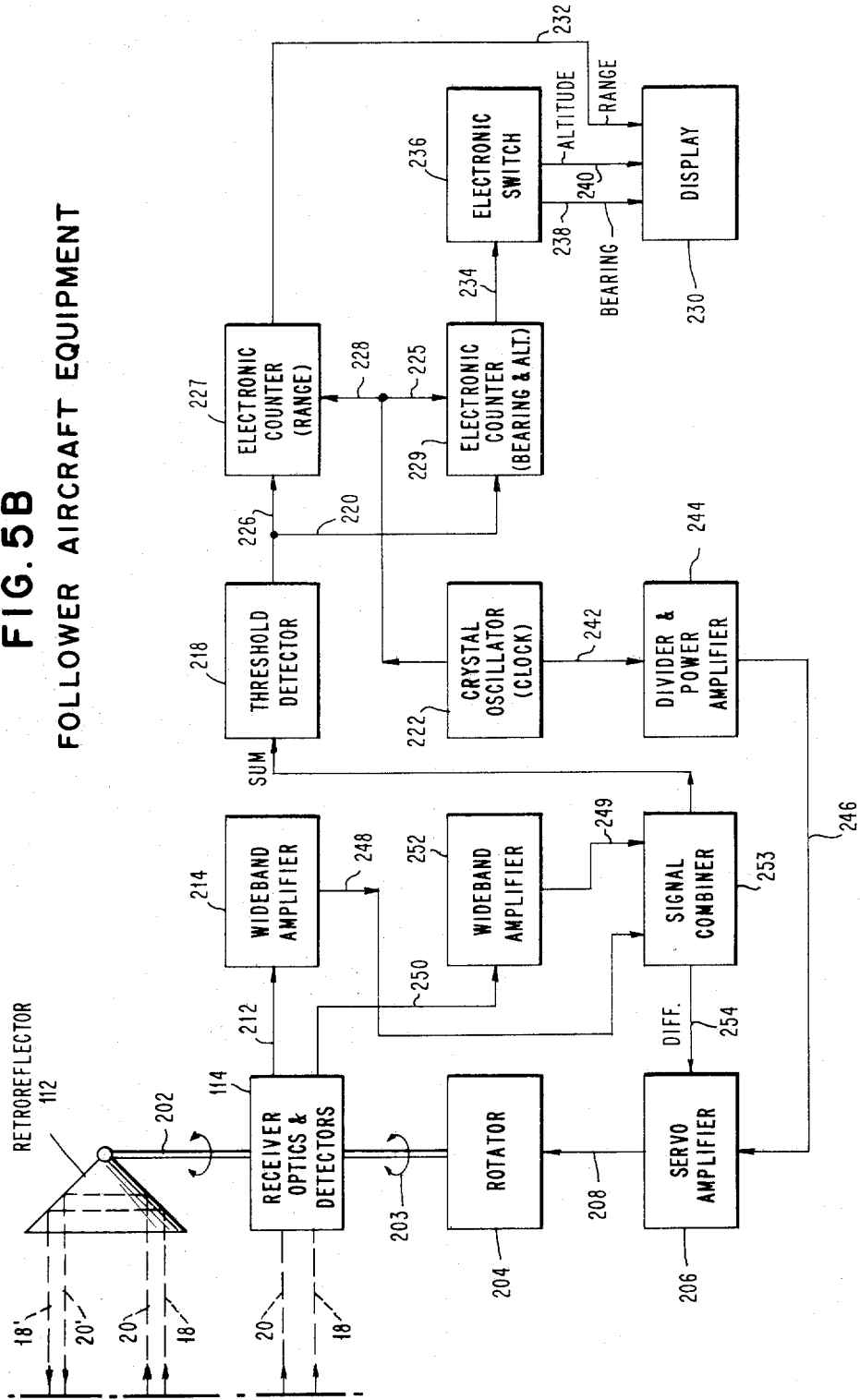

3,484,167
FORMATION FLIGHT CONTROL SYSTEM
Howard M. Burns, Jr., Rockville, Md., assignor to International Business Machines Corporation, Armonk, N.Y., a corporation of New York
Filed July 11, 1967, Ser. No. 652,508
Int. Cl. G01c 3/08
U.S. Cl. 356—5                           18 Claims

ABSTRACT OF THE DISCLOSURE

This disclosure presents a system for controlling the formation flight of a follower aircraft relative to the flight of a leader aircraft. Bearing information is communicated from the leader aircraft to the follower aircraft via a rotating fan-beam of pulse modulated electromagnetic energy, e.g., a laser beam, which is caused to transverse the position of the follower aircraft with a pulse repetition frequency that is related synchronously to the bearing of the follower aircraft relative to the flight direction of the leader aircraft. The fan-beam conveying the bearing information from the leader aircraft to the follower aircraft directs electromagnetic energy above and below the horizontal plane relative to the ground to which the flight direction of the leader aircraft is occurring and in a circumferential direction in a narrow angular beam.

Altitude information is conveyed by the leader aircraft to the follower aircraft by an orthogonal fan-beam which is caused to rotate about a vertical axis and to nod above and below a horizontal plane through the leader aircraft relative to the ground with a pulse repetition frequency which is related synchronously to the angular distance from the horizontal plane to the nod position.

The leader aircraft identifies the range of the follower by measuring the time delay of reflected electromagnetic energy and relates it to the follower aircraft by a double-pulse where spacing between the two pulses is indicative of the measured range.

BACKGROUND OF INVENTION

This invention relates generally to formation flight control systems, and it relates more particularly to such systems for establishing bearing, altitude, and range of a follower aircraft relative to a leader aircraft.

In many instances involving low-level formation flight of low-speed rotary or fixed-wing aircraft, it is necessary or desirable that the operation be under the control of a leader aircraft. With necessary equipment aboard the leader and follower aircraft, communication channels are established to allow the follower to maintain continuously their assigned positions relative to that of the leader and thus to each other.

A number of techniques have been developed previous for controlling formation flight, including ones that make use of optical and microwave systems. However, the equipment required for the leader and for the follower aircraft is complex and bulky, and the resolution provided is usually limited by restrictions that must be placed on the physical size of the transmitting and receiving apertures. A difficult technical problem to date has been that of providing bearing information to the follower aircraft.

OBJECTS

It is an object of this invention to provide a formation flight control system for a follower aircraft relative to a leader aircraft.

It is another object of this invention to provide a formation flight control system for maintaining a given flight pattern of a follower aircraft relative to a leader aircraft by incorporating techniques for transmitting bearing information, altitude information, and range information from the leader aircraft to the follower aircraft.

It is another object of this invention to provide a communication system between one reference frame and another reference frame in order that the latter reference frame can maintain itself relative to the first reference frame in a prescribed manner under information control thereof.

It is another object of this invention to provide a formation flight control system wherein electromagnetic energy is transmitted from a leader aircraft to a follower aircraft in a fan-beam whose relative orientation with respect to a vertical axis through the leader aircraft provides bearing information and whose relative orientation with respect to a horizontal plane through the leader aircraft provides altitude information.

The foregoing and other objects, features, and advantages of the invention will be apparent from the following more particular description of a preferred embodiment of the invention, as illustrated in the acompanying drawings.

DESCRIPTION OF THE DRAWINGS

FIG. 3 is a pattern of electromagnetic energy pulses for communicating information concerning azimuth, altitude, and range by a leader aircraft to a follower aircraft.

FIG. 5B is the counterpart arrangement at a follower aircraft of hardware for an operational arrangement as set forth in FIG. 5A for a leader aircraft.

SUMMARY OF INVENTION

This invention provides a formation flight control system for maintaining station keeping of one or several follower aircraft relative to a leader aircraft. Communication channels are established between the two aircraft for obtaining and transmitting data on bearing or azimuth, altitude or elevation, and range for the follower aircraft. By a synchronously variable pulse repetition frequency in the energy of several transmitted electromagnetic energy beams, the leader conveys the required station keeping data to the follower. One fan beam which has a narrow angular dimension in the horizontal plane communicates bearing data. Another fan beam with a narrow angular dimension perpendicular to the horizontal plane communicates altitude data. Range data is communicated by the leader by making a radar return time measuresment and transmitting sequential electromagnetic energy pulses whose spacing is indicative of the range.

Figure 1:
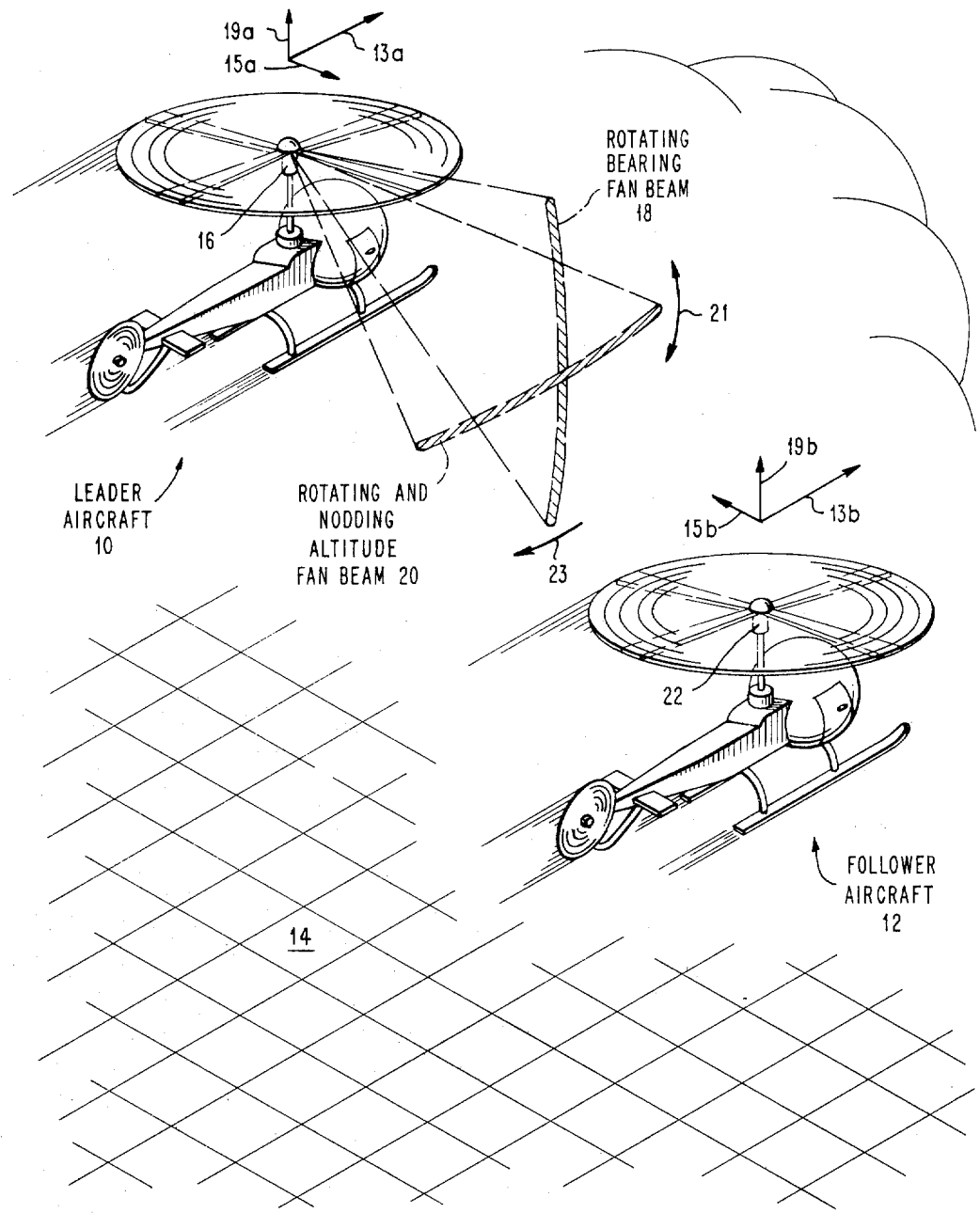
FIG. 1 is a schematic three dimensional drawing presenting the formation flight of a leader aircraft and a follower aircraft and the basic electromagnetic energy patterns utilized for communicating bearing or azimuth, altitude or elevation, and range data from the leader aircraft to the follower aircraft.

A general understanding of this invention will be presented with references to FIG. 1, which is a schematic three dimensional drawing, illustrating a formation flight control system of a leader aircraft 10 relative to a follower aircraft 12. Under the operational conditions presumed for FIG. 1, both aircraft are moving along parallel flight paths 13a and 13b in respective horizontal planes with the ground plane 14 as a reference. Axes 15a and 15b are directed from leader aircraft 10 to follower aircraft and vice versa, respectively. Illuminator 16 mounted on an upper portion of aircraft 10 radiates fan beams of electromagnetic energy 18 and 20; illuminator 16 may desirably be a laser beam source. Fan beam 18 is radiated from aircraft 10 in a narrow beam. The horizontal beamwidth is dependent upon the desired bearing resolution and is typically less than 2°. The beam 18 has extremes of approximately 45° above and below the horizontal plane, dependent upon the limits of desired altitude coverage. Fan beam 18 is caused to transverse a complete circumferential path 23 about the vertical axis 19a through illuminator 16 and is pulsed with a pulse repetition frequency which is related synchronously to the angular bearing of the fan beam 18 relative to the flight path of aircraft 10.

The span of the fan beam 20 in the horizontal plane is dependent upon the relationship between rotation-rate and nod-rate. It is typically 90°. The beamwidth in the vertical direction of fan beam 20 is dependent upon desired altitude resolution and is typically less than 2°. The altitude fan beam 20 is caused to nod in angular path 21 above and below the horizontal plane in a sine wave motion, as it is rotated about the vertical axis 19a, and the pulse repetition frequency thereof is related synchronously to the angular position of fan beam 20 relative to the horizontal plane.

Follower aircraft 12 is equipped with a steerable receiving aperture 22 established on an upper portion thereof in reception relationship to transmitted fan beams 18 and 20. The shape of the aperture for receiving transmitted beams 18 and 20 is chosen to optimize acquisition, tracking and signal-to-noise performance at the receiver. Typically, it is a vertical aperture of somewhat larger angular dimensions than those of fan beam 18.

Figure 2A:
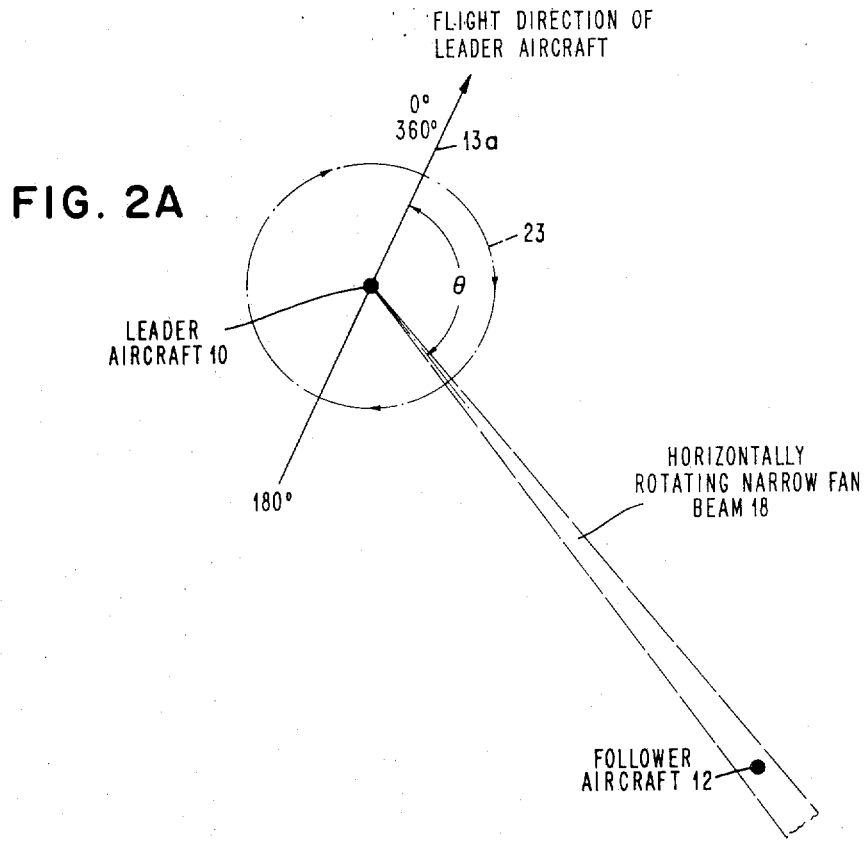
FIGS. 2A, 2B, and 2C present line diagrams illustrating the manner in which the pulse repetition frequency of a transmitted beam from the leader aircraft is varied synchronously with regard to the angular position of the beam from the flight direction to present both bearing and altitude information to a follower aircraft.

The nature of the data acquisition by the follower aircraft 12 of bearing information transmitted from the leader aircraft 10 will be described with reference to FIG. 2 which presents line diagrams illustrating: in FIG. 2A the transmission and reception of the bearing beam from the leader aircraft to the follower aircraft; and in FIG. 2B the relative value of the pulse repetition frequency from the leader aircraft with relationship to the angular direction of the bearing beam to the direction of flight of the leader aircraft, i.e., a ground path. The direction of the flight path of the leader aircraft is shown as arrow 13a. The circumferential path of the bearing fan beam is illustrated as circle 23. Bearing fan beam 18 has an angular beamwidth in the horizontal plane of lesser dimension than the desired bearing resolution and is shown as interceptiong the follower aircraft 12. Illustratively, it is desirable to obtain data at the follower aircraft at a minimum rate of two samples per second. Accordingly, the scan-rate of the fan beam 18 about the vertical axis 19a (FIG. 1) requires a minimum of two revolutions per second. The angle θ is a measure of the instantanous angular direction of the bearing fan beam relative to the flight direction 13a of the leader aircraft.

The normal requirement for bearing resolution in a formation flight control system is approximately ±2°. For this requirement, laser beams and other radiating systems, e.g., microwave and millimeter wave systems can readily be utilized for the practice of this invention.

Recent developments in solid-state and bulk-semiconductors for the generation and the detection of electromagnetic energy are especially suitable for the practice of this invention of which the following are illustrative literature articles:

(1) "High Power Gallium Arsenide Laser Diodes" by L. Wandinger et al., U.S. Army Electronics Command, October 1965, U.S. Government Defense Documentation No. AD 627084.

(2) "Optical Communciations Employing Semiconductor Lasers" by E. J. Chatterton, Massachusetts Institute of Technology, 1965, U.S. Government Defense Documentation No. AD 639243.

Figure 2B:
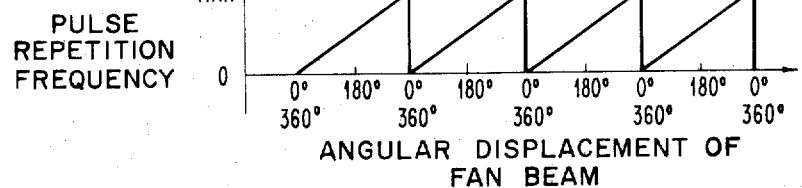
Figure 2C:
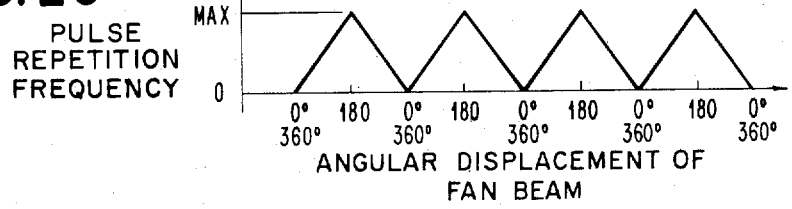

In FIGS. 2B and 2C the pulse repetition frequency of the laser beam emitter (illuminator 16 of FIG. 1) at the leader aircraft is presented as a function of the angular position of the fan beam 18. In FIG. 2B the pulse repetition frequency is illustrated as changing linearly with angle from 0° to 360°; and in FIG. 2C the pulse repetition frequency of the laser emitter at the leader aircraft is shown as increasing linearly from the flight direction to 180° and then decreasing linearly to 360°. For some flight pattern maintenance requirements, the variation of the pulse repetition frequency presented in FIG. 2C enhances the information obtained for a follower aircraft in the 180° direction relative to the flight path of the leader aircraft. Other desirable variations of the pulse repetition frequency with angle are possible including ones specifically selected for digital programming of the pulse repetition frequency.

The nature and relationship of various pulses of a formation flight control system for practice of this invention will be understood with reference to FIG. 3 wherein there is presented several pulse patterns illustrative of the instantaneous pulse conditions at both leader aircraft and follower aircraft for fan beam 18. The pulse repetition frequency interval, i.e., PRF, illustrated in FIG. 3A is indicative of the periodicity of the basic pulse pattern transmitted by the leader aircraft. FIG. 3B identifies the signal received by the follower aircraft at a time $R/2$ equal to the one-way transmission delay-time between the leader aircraft and the follower. The pulse period at maximum PRF is large compared to the maximum two-way time delay to be encountered between the leader aircraft and the follower aircraft, thus preventing ambiguity in the measurement of range. FIG. 3C presents the retro-reflected signal pattern received at the leader aircraft after reflection from the follower aircraft of the signal of FIG. 3B received at the follower aircraft. After a two-way transmission delay time R, the the leader aircraft in order to transmit range data to the follower aircraft transmits a double-pulse pattern shown in FIG. 3D where the time delay R′ between sequential pulses of the double pulse pattern is calibrated to convey the range measurement to the follower aircraft. FIG. 3E presents the double-pulse pattern as it arrives at the follower aircraft at time $R/2$ after transmission. The calibrated interval R′ is representative of the range measurement made at the leader aircraft. Either R′ may duplicate the two-way transmission delay R measured at the leader aircraft, or it may be chosen as a calibrated interval more suitable to the system operational requirements.

The requisite variation in pulse repetition frequency from the illuminator 16 of FIG. 1 is dependent upon the desired sample rate, the desired resolution, and the choice of pattern for PRF variation, e.g., FIG. 2B or FIG. 2C. For example, the minimum PRF for a sample rate of two samples per second, a resolution cell of 2°, and a minimum of two pulses per resolution cell, is 720 pulses per second. For nanosecond risetime capability of an illustrative GaAs laser beam illuminator 16 (FIG. 1), incremental increases in the PRF of 1 microsecond for the identification of each resolution cell is easily accomplished. The maximum PRF is then approximately 1500 pulses per second or double the minimum value, and unambiguous range measurement of greater than 5 miles is available. The example illustrates the permissible flexibility in programming the pulse repetition frequency for the practice of this invention. Complex programming including those for automatic flight control via digital computer are feasible.

Figure 4:
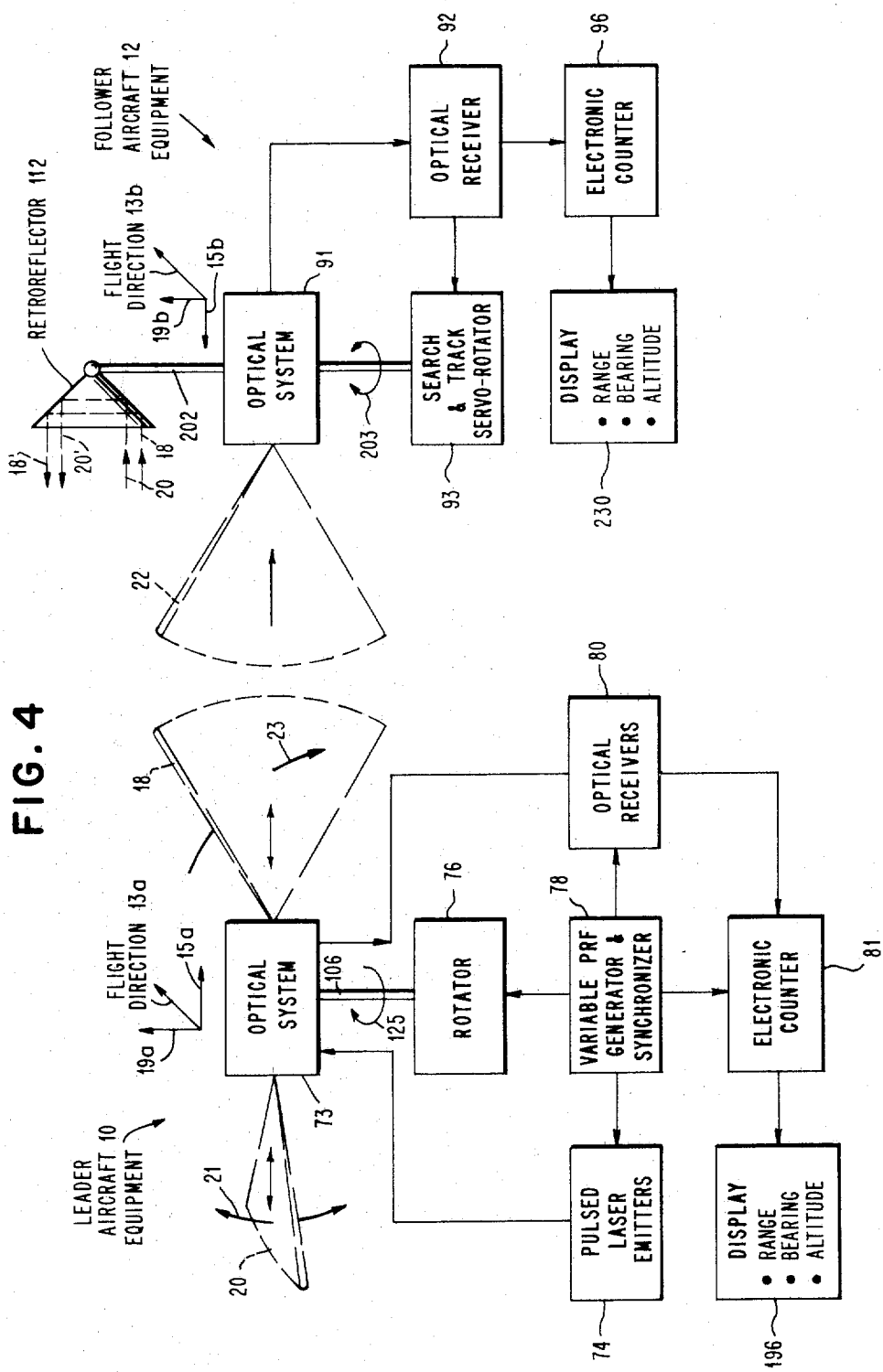
FIG. 4 is a simplified schematic diagram of a formation flight control system according to this invention to present the principles of its construction and operation.

The general relationship of the bearing beam 18 and the altitude beam 20 and the manner in which they are rotated about the vertical axis relative to the leader aircraft is presented in FIG. 4, together with a schematic outline of the equipment at the leader aircraft and at the follower aircraft. For convenience, the altitude beam 20 is illustrated as having 180° angular displacement from the bearing beam 18. For isolation purpose, the beams are placed physically relative to one another in such a manner that they do not interfere or overlap one another. This allows the follower aircraft to discern readily the information presented. Isolation may also be accomplished by using different frequency channels, or suitable polarization of the emissions along with selective retroreflective apertures on the follower aircraft. There is equipment at leader aircraft 10 for scanning of the transmitted laser beams, for modulating the pulse repetition frequency thereof, and for receiving of retroreflected laser illumination from the follower aircraft 12. At the leader aircraft 10, there are two transmitted beams; the bearing beam 18 and the altitude beam 20. There are associated matching receiving beamwidths at the leader aircraft. The transmitted beams 18 and 20 are provided by conventional pulsed laser light emitters 74 and the optical system 73. In the practice of this invention, the laser emitters 74, optical system 73, and optical receivers 80 may conveniently be replaced by suitable microwave emitters, detectors, and antennae. Connected to the optical system 73 is a rotator mechanism 76 which may either be a mechanical device which physically rotates a related transmitted beam, or it may be an electrical device which properly phases an array of laser emitters to direct the transmitted beam along a particular spatial orientation. Rotation of the rotor 74 is synchronized by the variable pulse repetition frequency generator 7 in a given manner which may conveniently be according to the pattern of FIG. 2B wherein there is a linear change from direction of the flight path of the leader aircraft around the 360° arc; or it may conveniently be such as illustrated in FIG. 2C, where there is a linear increase to 180° of arc from the direction of the flight path 13a of the leader aircraft 10 and a linear decrease of the pulse repetition frequency thereof for the last one-half portion of the arc. The optical system 73 admits reflected energy from a follower aircraft 12 to optical receivers 80 which in turn are connected to electronic counter 81 and display 196. The pulse repetition frequency generator 78 is further connected to the electronic counter 81 so that the received signals may be properly correlated with the transmitted pulse.

At the follower aircraft 12 location of FIG. 4 receiver beam 22 is the spatial aperture of optical system 91 for admitting electromagnetic energy to optical receiver 92. Near the location of the optical receiver 92 is retroreflector device 112 or returning a portion of the received laser illumination to the leader aircraft. The relationship of retroreflector 112 to leader aircraft 10 is shown in greater detail in FIG. 5B. Search and track servo rotator 93 maintains the orientation of optical system 91 to permit reception of laser pulses from the leader aircraft. An electronic counter 96 accepts the pulse information presented by optical receiver 92 and provides bearing, altitude, and range information to the display 230 at the operational control center of the follower aircraft 12. By measurement of the pulse repetition frequency of the vertical fan beam 18, the follower aircraft identifies its bearing relative to the flight path 13a of the leader aircraft. By measurement of the pulse repetition frequency of the nodding horizontal fan beam 20, the follower aircraft identifies its altitude; and by measurement of the time delay between the range data sequential pulses transmitted by the leader aircraft, it identifies its range relative to the leader aircraft.

Figure 5A:
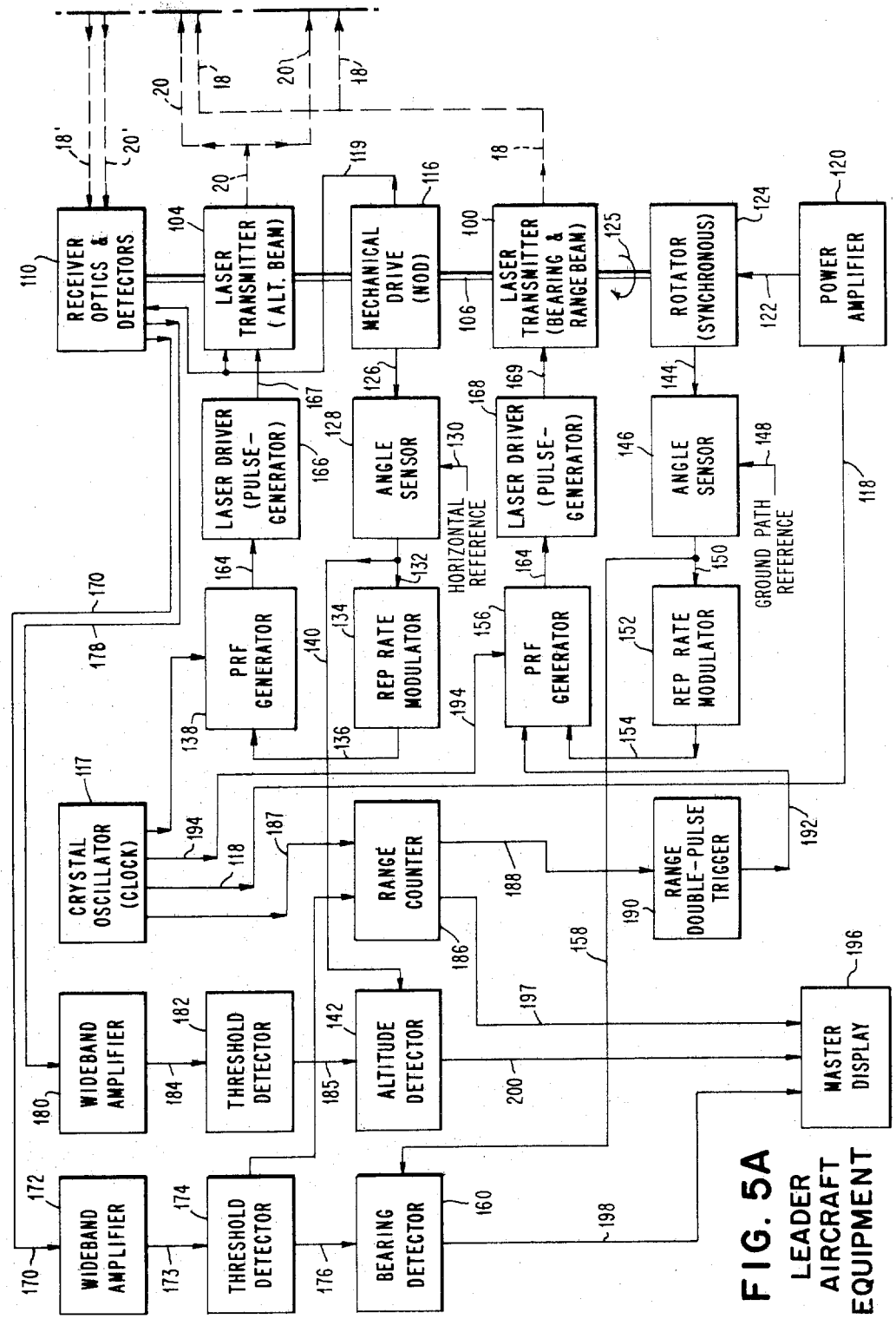
FIG. 5A is a block diagram presenting the operational hardware for a formation flight control system at a leader aircraft in accordance with this invention.

An embodiment of this invention illustrating the several apparatus items utilized for its operation will now be described in considerable detail with reference to FIGS. 5A and 5B which are respectively schematic block diagrams characterizing the nature of the equipment at the leader aircraft and at the follower aircraft to effect the transmission and reception of the appropriate information of flight parameters. At the leader aircraft 10, there is a GaAs laser transmitter 100 which radiates a rotating vertical fan beam indicated by dotted line 18 conveying both bearing and range information for the follower aircraft of FIG. 5B. Another laser transmitter 104 is coupled by a common rotating shaft 106 to the laser transmitter 10 and the rotator 124. Laser transmitter 104 presents a nodding and rotating fan beam in the horizontal indicated by dotted line 20 for providing altitude information to the follower aircraft 12 of FIG. 5B. As noted hereinbefore, both beam 20 conveying the altitude information and beam 18 conveying the bearing and range information may be radiated simultaneously in the same direction if technique is provided for identifying their respective data. For the embodiment of this invention presented in FIGS. 5A and 5B, altitude beam 20 is considered to be 180° displaced in angular arc from the direction of the bearing beam 18. Further, established on the common coupling shaft 106 is the block 110 which involves the receiver optics and detectors for the returned electromagnetic energy from the retroreflector 112 of FIG. 5B. Both bearing beam 18 and altitude beam 20 are received at the follower aircraft by the block identified as receiver optics and detectors 110. A mechanism for causing the horizontal fan beam 20 to nod above and below the horizontal plane is identified as mechanical drive 116 and is mechanically coupled to the common shaft 106 in FIG. 5A and electrically connected to laser transmitter 104 and receiver optics and detectors 110 via line 119. The source of timing and synchronization in the equipment at the leader aircraft is the crystal oscillator or clock 117 which is connected via line 118 to power amplifier 120 which transmits drive power on line 122 to the rotator, e.g., a synchronous motor, 124 which is coupled to shaft 106 to rotate the assembly in a 360° arc 125 about the vertical axis.

The mechanical drive 116 for nodding the altitude beam 20 from laser transmitter 104 is coupled via line 126 to angle sensor 128 which has additional information imparted thereto on line 130 carrying horizontal reference information from a source in the leader aircraft, not shown, according to conventional practice. The angle sensor 128 is connected along one path 132 to repetition rate modulator 134 which controls via line 136 the pulse repetition frequency provided by generator 138; and is connected along a second path 140 to elevation detector 142. The synchronous rotator 124 is connected via line 144 to angle sensor 146 which has coupled to it ground path reference data on line 148 from a source in the leader aircraft according to conventional practice. Angle sensor 146 is connected along one path 150 to repetition rate modulator 152, which is in turn connected by line 154 to a pulse repetition frequency generator 156; and along another path 158 to bearing detector 160.

The pulse repetition frequency generator 138 and the pulse repetition frequency generator 156 are connected respectively via lines 162 and 164 to laser drivers 166 and 168. They are connected in turn to laser transmitters 104 and 100 on lines 167 and 169, respectively. The laser drivers 166 and 168 provide narrow pulses of driving power to laser transmitters 100 and 104, e.g., approximately 100 nanoseconds duration.

The receiver detectors of block 110 of the leader aircraft are conveniently solid state devices. Reflected pulses 18' from the follower aircraft providing bearing information are transmitted from the receiver optics and detectors block 110 via line 170 to wide band amplifier 172 and therefrom to a threshold detector 174 on line 173 which is in turn connected to the azimuth detector 160 on line 176. Altitude information from reflected pulses 20' is conveyed on line 178 to a wide band amplifier 180 and therefrom to a threshold detector 182 along line 184 which supplies signals to altitude detector 142 via line 185. The threshold detector 174 output on line 176 is related to the ground path reference on line 148 to the angle sensor on 146 which is communicated to the bearing or azimuth detector 160 on line 158; and the horizontal reference applied to the angle sensor 128 is related to the elevation information supplied to the elevation or altitude detector 142 from threshold detector 182.

The threshold detector 174 for the elevation information is communicated to range counter 186 together with clock data on line 187 from the crystal oscillator 117. Range counter 186 is connected via line 188 to range double-pulse trigger 190 which is in turn connected via line 192 to the pulse repetition frequency generator 156 for the bearing and range beam 18 provied by the laser transmitter 100. Timing of the pulse repetition frequency generator 156 is controlled by the crystal oscillator clock 117 via line 194.

Crystal oscillator 117 is connected via line 187 to the range counter 186 which is further connected to the master display 196 via line 197. Additionally, both the bearing or azimuth detector 160 and the altitude or elevation detector 142 are connected via lines 198 and 200, respectively, to master display unit 196. Accordingly, signals reflected from the follower aircraft 12 of FIG. 5B are detected by the solid state detectors of the receiver optics and detectors 110; and signals exceeding a preset threshold are related to the ground path and horizontal references supplied to angle sensor 146 and angle sensor 128, respectively. The measured values are displayed aboard the leader aircraft 10 of FIG. 5A on master display 196. The measurement of range of the follower aircraft 12 of FIG. 5B is indicated thereto by transmitting via the vertical fan beam 18 the double pulse range data (FIG. 3) having an intra-pulse period that is representative of the range measurement identified by range counter 186.

In summary, the instantaneous bearing or azimuth of the vertical fan beam 18 relative to the ground path reference established on line 148 to the angle sensor 146 and the instantaneous elevation angle of the horizontal fan beam 20 relative to the horizontal reference established on line 130 to angle sensor 128 are each indicated to follower aircraft 12 by the pulse repetition frequency emitted by the respective beams (FIG. 3). The basic timing for the laser transmitter 104 for the elevation beam 20 and for the laser transmitter 100 for the bearing and range beam 18 is generated by the crystal oscillator of block 117. The pulse repetition frequency produced by generator 138 and 156 for the respective laser driver 166 and 168 is modulated by the respective repetition rate modulator 134 and 152 in synchronism with the instantaneous angular position of the associated transmitted beams 20 and 18.

The detailed nature and operation of the aspect of the system of FIG. 5 as related to the follower aircraft will now be described with reference to FIG. 5B. Retroreflector 112 is coupled via a common shaft 202 to the block identified as receiver optics and detectors 114 and to the rotator 204. The optical retroreflector 112 enhances the target reflection returned to the leader aircraft 10. Alternatively, several reflectors, not shown, may be placed about the follower aircraft to obviate the need for orientation. As shown in FIG. 5B, the single retroreflector 112 is continuously oriented to peak the reflected laser illumination returned to the leader aircraft.

Both the retroreflector 112 and the receiver optics and detectors 114 are directed in azimuth arc 203 by rotator 204 which is controlled by servo-control unit 206 on line 208. There are two sub-systems included in the equipment at the follower aircraft 12 to supply tracking signals for servo control 206. The receiver optics and detectors 114 supplies two signal components to two wide band amplifiers 214 and 252 on lines 212 and 250, respectively. Amplified signals on lines 248 and 249 are combined in signal combiner 253, and the difference-signal is supplied to the servo-control amplifier 206 on line 254. Power for the rotator 204 is developed by divider and power amplifier 244 at a frequency and phase determined by crystal oscillator 222 on line 242. The rotator 204 receives power via line 246 interconnecting the divider and power amplifier 244 and servo-control amplifier 206. Signals from the leader aircraft 10 of FIG. 5A are tracked at the follower aircraft 12 by automatically minimizing the difference signal in the servo-control loop on line 254.

The sum signal on line 255 from the signal combiner 253 is supplied to threshold detector 218. Signals exceeding a preset threshold are supplied to two electronic counters 227 and 229 on lines 226 and 220, respectively. Counter 227 measures the intra-pulse interval of the range double-pulse (FIG. 5D) emitted by the leader aircraft 10. Counter 210 alternately measures the pulse repetition frequency of the bearing and elevation beams emitted by the leader aircraft. The time base for the measurements is supplied from the crystal oscillator 222 to counter 227 on line 228 and to counter 229 on line 225.

Bearing, altitude, and range data are displayed at the follower aircraft on display 230. Counter 227 supplies the range data on line 232. Bearing and altitude data are alternately supplied on lines 238 and 240, respectively, by electronic switch 236. The switch 236 alternately receives bearing and altitude data from electronic counter 229 on line 234. A single dual-purpose counter 229 for measuring both bearing and altitude is useful because of the 180° displacement of the rotating bearing and altitude fan beams 18 and 20 emitted by the leader aircraft.

The values of the bearing, altitude, and range as displayed aboard the follower aircraft on display 230 may conveniently be related to the flight-plan values to obtain alarm and/or control data for operation of the follower aircraft.

This invention may conveniently be practiced for landing an aircraft on a platform. Two fan beams are employed in much the same manner as in the follow-the-leader use, i.e., formation flight, described in considerable detail hereinbefore, to supply azimuth, elevation, and range data to a landing aircraft. By employing a number of fixed narrow horizontal and vertical fan beams, each modulated with a pulse repetition frequency which identifies the relative angle peculiar to that beam, control for a complex landing pattern is accomplished. Alternatively, a single pencil beam is conveniently used to acquire and track a landing aircraft; and the instantaneous azimuth angle, elevation angle, and range data are supplied to the landing aircraft by modulating pulse repetition frequency and by transmission of a double-pulse for range information.

The practice of this invention has been described and illustrated mainly for a leader aircraft and a follower aircraft. However, it will be understood that the formation flight control system is applicable for several follower aircraft, each of which is analogous to the disclosed follower aircraft 12.

While the invention has been particularly shown and described with reference to a preferred embodiment thereof, it will be understood by those skilled in the art that the foregoing and other changes in form and details

What is claimed is:

1. Method for determining the angular orientation of a remote station relative to a given geometrical base at a control station comprising the steps of:
    radiating a beam of laser light energy from said control station with a pulse repetition frequency related synchronoously to the angular orientation of said beam relative to a geometrical base at said control station;
    measuring said pulse repetition frequency at said remote station to determine the orientation of said remote station relative to said given geometrical base;
    reflecting at said remote station a portion of said radiated beam to said control station; and
    transmitting to said remote station sequential double-pulses from said control station on said beam indicative of said measured range therefrom of said remote station.

2. Method for determining the bearing of a remote station relative to a given direction at a control station comprising the steps of:
    radiating a beam of laser light energy from said control station with a pulse repetition frequency related synchronously to the angular orientation of said beam from a given direction at said control station;
    measuring said pulse repetition frequency at said remote station to determine the bearing of said remote station relative to said given direction;
    reflecting at said remote station a portion of said radiated beam to said control station; and
    transmitting to said remote station sequential double-pulses from said control station on said beam indicative of said measured range therefrom of said remote station.

3. Method for determining the altitude of a remote station relative to a given plane at a control station comprising the steps of:
    radiating a beam of laser light energy from said control station with a pulse repetition frequency related synchronously to the angular orientation of said beam relative to a given plane at said control station;
    measuring said pulse repetition frequency at said remote station to determine the altitude of said remote station relative to said given plane;
    reflecting at said remote station a portion of said radiated beam to said control station; and
    transmitting to said remote station sequential double-pulses from said control station on said beam indicative of said measured range therefrom of said remote station.

4. Method for controlling formation flight of a follower aircraft relative to a leader aircraft comprising the steps of:
    radiating a fan beam of laser light energy from said leader aircraft with a pulse repetition frequency related synchronously to the angular orientation of the narrow portion of said fan beam to a geometrical base at said leader aircraft;
    measuring said pulse repetition frequency at said follower aircraft to determine the angular orientation of the position of said followed aircraft relative to said geometrical base at said leader aircraft;
    reflecting at said follower aircraft a portion of said radiated fan beam to said leader aircraft; and
    transmitting to said follower aircraft sequential double-pulses from said leader aircraft on said fan beam indicative of said measured range therefrom of said follower aircraft.

5. Method for controlling formation flight of a follower aircraft relative to a leader aircraft comprising the steps of:
    radiating laser light energy from said leader aircraft in a narrow vertical fan beam relative to a reference plane with a pulse repetition frequency related synchronously to the angular bearing orientation of said beam to the flight direction of said leader aircraft;
    measuring at said follower aircraft the timing interval between sequential pulses of said fan beam thereby providing information at said follower aircraft of said bearing of said follower aircraft relative to said flight direction of said leader aircraft;
    reflecting at said follower aircraft a portion of said radiated fan beam to said leader aircraft; and
    transmitting to said follower aircraft sequential double-pulses from said leader aircraft on said fan beam indicative of said measured range therefrom of said follower aircraft.

6. Method as set forth in claim 5 including the step of scanning said fan beam over an angular sector determined at said leader aircraft.

7. Method as set forth in claim 6 wherein said angular sector is 360°.

8. Method as set forth in claim 5 wherein said reference plane is the ground plane.

9. Method for controlling formation flight of a follower aircraft relative to a leader aircraft comprising the steps of:
    radiating a fan beam of laser light energy from said leader aircraft with a narrow angular spread in a direction perpendicular to a reference plane through said leader aircraft with a pulse repetition frequency related synchronously to the angular orientation of said fan beam to said plane;
    measuring at said follower aircraft the timing interval between sequential pulses of said fan beam thereby providing information at said follower aircraft of the altitude of said follower aircraft relative to said leader aircraft;
    reflecting at said follower aircraft a portion of said radiated fan beam to said leader aircraft; and
    transmitting to said follower aircraft sequential double-pulses from said leader aircraft on said fan beam indicative of said measured range therefrom of said follower aircraft.

10. Method as set forth in claim 9 including the step of varying synchronously the pulse repetition frequency of said laser light energy of said fan beam while nodding it through an angular sector above and below said reference plane.

11. Method as set forth in claim 10 wherein said reference plane is a horizontal plane parallel to the ground plane.

12. Method for controlling formation flight of a follower aircraft relative to a leader aircraft comprising the steps of:
    radiating first laser light energy from said leader aircraft in a narrow vertical first fan beam relative to a reference plane with a pulse repetition frequency related synchronously to the angular bearing orientation of said beam to the flight direction of said leader aircraft;
    measuring at said follower aircraft the timing interval between sequential pulses of said fan beam thereby providing information at said follower aircraft of said bearing of said follower aircraft relative to said flight direction of said leader aircraft;
    radiating a second fan beam of second laser light energy from said leader aircraft with a narrow angular spread in a direction perpendicular to said reference plane through said leader aircraft with a pulse repetition frequency related synchronously to the angular orientation of said second fan beam to said reference plane;
    measuring at said follower aircraft the timing interval between sequential pulses of said second fan beam thereby providing information at said follower aircraft of the altitude of said follower aircraft relative to said leader aircraft;

reflecting at said follower aircraft a portion of at least one of said radiated fan beams to said leader aircraft; and transmitting to said follower aircraft sequential double-pulses from said leader aircraft on at least one of said fan beams indicative of said measured range therefrom of said follower aircraft.

13. Method as set forth in claim 12 including the steps of:

scanning said first fan beam over a first angular sector determined at said leader aircraft; and nodding said second fan beam through a second angular sector above and below said reference plane.

14. Method as set forth in claim 13 wherein said reference plane is a horizontal plane parallel to the ground plane.

15. In a method for controlling formation flight of a follower aircraft relative to a leader aircraft, the steps of:

radiating a fan beam of laser light energy from a leader aircraft to a follower aircraft;

modulating the pulse repetition frequency of said laser light energy according to angular relationship of said fan beam to the flight direction of said leader aircraft;

altering synchronously said pulse repetition frequency relative to said angular relationship to transmit bearing information to said follower aircraft;

reflecting at said follower aircraft a portion of said radiated fan beam to said leader aircraft; and transmitting to said follower aircraft sequential double-pulses from said leader aircraft on said fan beam indicative of said measured range therefrom of said follower aircraft.

16. In a method for controlling formation flight of a follower aircraft relative to a leader aircraft comprising the steps of:

radiating a fan beam of laser light energy from a leader aircraft to a follower aircraft;

modulating the pulse repetition frequency of said laser light energy according to angular relationship to a horizontal plane at said leader aircraft;

altering synchronously said pulse repetition frequency relative to said angular relationship to transmit altitude information to said follower aircraft;

reflecting at said follower aircraft a portion of said radiated fan beam to said leader aircraft; and transmitting to said follower aircraft sequential double-pulses from said leader aircraft on said fan beam indicative of said measured range therefrom of said follower aircraft.

17. A method as set forth in claim 12 wherein both beams are reflected by the same reflecting device.

18. A method as set forth in claim 15 wherein both beams are reflected by the same reflecting device.

References Cited

UNITED STATES PATENTS

| | | | |
|---|---|---|---|
| 2,485,582 | 10/1949 | Frum | 343—106 X |
| 2,952,845 | 9/1960 | Begovich et al. | 343—108 |
| 3,191,175 | 6/1965 | Battle et al. | 343—108 |
| 3,202,994 | 8/1965 | Fombonne | 343—108 |
| 3,242,491 | 3/1966 | Winter | 343—108 |
| 3,312,971 | 4/1967 | Gehman | 343—6.5 |
| 3,400,398 | 9/1968 | Lapeyre et al. | 343—106 |

RODNEY D. BENNETT, JR., Primary Examiner

RICHARD E. BERGER, Assistant Examiner

U.S. Cl. X.R.

343—106